J. E. BOLLING.
APPARATUS FOR CONDITIONING GAS.
APPLICATION FILED FEB. 6, 1917.

1,305,518.

Patented June 3, 1919.

John E. Bolling INVENTOR
BY
F. E. Terwilliger ATTORNEY

UNITED STATES PATENT OFFICE.

JOHN E. BOLLING, OF NEWARK, NEW JERSEY.

APPARATUS FOR CONDITIONING GAS.

1,305,518. Specification of Letters Patent. Patented June 3, 1919.

Application filed February 6, 1917. Serial No. 147,026.

*To all whom it may concern:*

Be it known that I, JOHN E. BOLLING, a citizen of the United States, residing in the city of Newark, county of Essex, and State of New Jersey, have invented certain new and useful Improvements in Apparatus for Conditioning Gas, of which the following is a specification.

My invention relates to the control of the degree of humidity possessed by a gas and particularly refers to air conditioning apparatus. In many arts, it is essential to control the humidity or amount of water vapor held in suspension in air. For instance, it is customary in drying varnish on fine furniture, automobile bodies and the like to place the goods in a kiln which is supplied with air whose temperature and degree of saturation are closely controlled in order to obtain the most efficient drying combined with the best finish of the article. Likewise in ventilating plants for public buildings, the degree of humidity of the air supplied is often controlled. The one common method of effecting such air conditioning is to supersaturate fresh air with moisture, eliminate the excess moisture so as to obtain air at a known temperature having 100 per cent. humidity, and then to heat this air to the desired temperature. The temperature of the water with which the air is initially supersaturated is also controlled and by governing this temperature as well as the final temperature of the air, it is possible to deliver air at the desired temperature possessing any predetermined percentage of humidity.

The most efficient method of supersaturating the air is to cause a current of air to pass through a spray. The air not only takes up sufficient moisture to give it 100 per cent. of humidity but also becomes supersaturated and carries along in mechanical suspension particles of moisture which are not in the form of true water vapor. This excess moisture is later reclaimed from the air, or at least separated from it, so that fully saturated air is obtained at substantially the temperature of the water forming the spray.

Hitherto, it has been the practice to use a forced system of circulation to produce the spray, but my invention relates to means for doing away with the necessity for any pump and substitutes a gravity feed, which will be essentially automatic in its operation.

Figure 1:
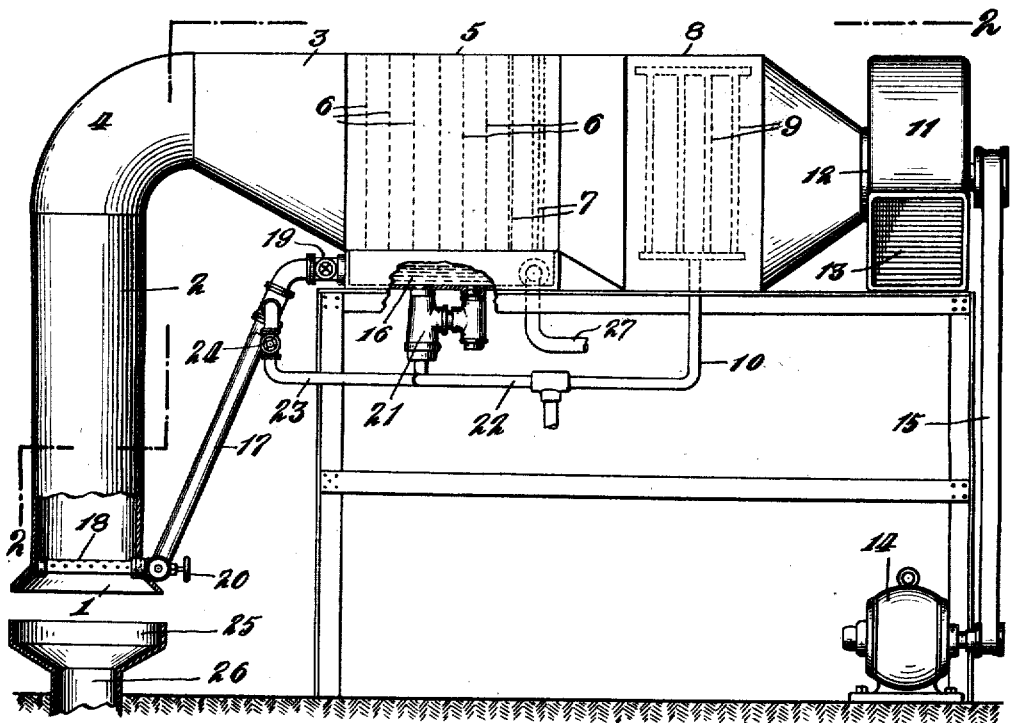
Figure 2:
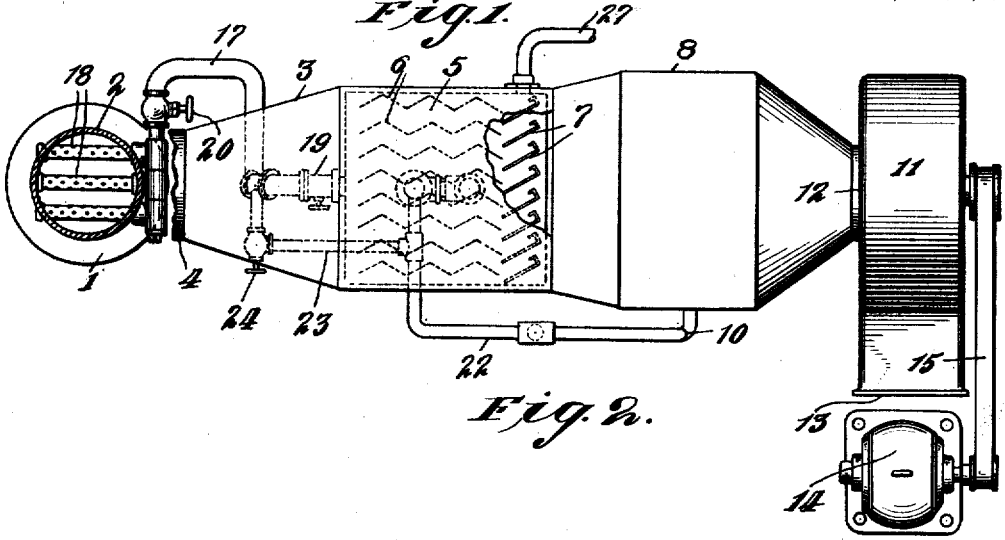

In the accompanying drawings, which form a part of this specification, Figure 1 is a side elevation of one type of apparatus for practising my invention and Fig. 2 is a plan view of the apparatus of Fig. 1, shown partly in section on line 2—2 of Fig. 1.

Referring to the drawings in detail, the numeral 1 designates an air inlet forming the mouth of a vertical duct flue 2, which is connected to the expanding mist chamber 3 by means of the round elbow 4. The mist chamber opens into the horizontal scrubber and eliminator chamber 5, which contains the zigzag vertically disposed scrubber plates 6 and the hooked eliminator plates 7. This chamber in turn opens into the heater chamber 8, in which may be placed any suitable form of heater 9 fed from the steam line 10. Air is adapted to be drawn through the entire system just described by means of a blower 11 having the inlet 12 and outlet 13. This blower may be driven in any suitable manner, as by being connected with an electric motor 14 by means of the belt 15. In the bottom of the scrubber and eliminator chamber is a water well or tank 16 connected with the inclined feed pipe 17 leading to the spray bank 18, which may consist of a plurality of horizontally disposed pipes perforated at the top and at the sides. A valve 19 controls the inlet to the pipe 17 at its top and a second valve 20 is placed between the bottom of the pipe and the spray bank. Any suitable means may be employed for controlling the temperature of the water within the water well 16, such as the ejector heater 21 fed from the steam line 22, which also is provided with a branch 23 leading to the upper end of the feed pipe 17 and provided with a valve 24. For accommodating any drip from the spray bank, a drip pan 25 having a connection 26 to the sewer or other outlet may be provided.

In the operation of my device, the fan or blower is rotated by the motor, thus drawing a current of air at relatively high velocity— say 2000 to 2500 feet per minute through the inlet 1. The valve 24 being closed and the valves 19 and 20 being open, water flows by gravity from the tank or well 16 through the feed pipe 17 into the spray bank 18, creating a mist of spray within the duct 2. The elevation of the tank above the level of the spray bank is sufficient to produce the required head to create the desired spray or mist. The air entering the inlet passes through the spray at high velocity and is heated to substantially the temperature of the water forming the spray and at the same time not only is saturated to 100 per cent. humidity, but becomes supersaturated, carrying globules of moisture in mechanical suspension. This mixture of air and water passes up through the duct 2 and elbow 4 and through mist chamber 3 until it strikes the scrubber plates 6. Some of the excess moisture is deposited on these plates and they also have the function of removing impurities from the air. After passing between the scrubber plates, the air encounters the eliminator plates 7 which catch the remainder of the excess moisture being carried in mechanical suspension in the air. This excess moisture drips down from both sets of plates into the water well or tank 16. The air meanwhile continues on its journey in a state of substantially 100 per cent. saturation, but without excess moisture, into the heater chamber 8 where it may be heated to any desired temperature by means of the heater 9 without either receiving or delivering up any of its mixture. It then passes through the blower 12 from whose outlet it emerges and may be led to any desired point.

Since the amount of mist or spray carried in mechanical suspension in the air between the inlet and scrubber and eliminator plates is greatly in excess of the water which has actually been taken up by the air in the form of water vapor to saturate it to 100 per cent. humidity, by far the larger part of the water flowing through the feed pipe 17 into the mist or spray bank will be returned by the eliminator and scrubber plates to the well 16, from which it again flows by gravity into the spray bank, so that the operation is cyclic and continuous in its character. In order to provide for the water which is permanently taken up by the air in the form of water vapor, I provide a supply pipe 27 which may be controlled by any suitable automatic means (not shown) such as a float valve, to maintain the water in the tank or well 16 at a constant level. In case the perforations in the mist or spray bank 18 becomes clogged with foreign matter at any time, they can be readily cleared of such obstruction by closing the valve 19 and opening the steam valve 24, thus blowing steam under pressure through the perforations.

I have described my invention as suitable for use with air, but it will be appreciated that it is adapted also for the conditioning or humidifying of other gases and for the use of other liquid than water.

While I have illustrated and described only certain specific embodiments of my invention, I realize that it is susceptible of wide adaptation and I do not desire to be limited to the precise structures shown and described.

Having thus described my invention, I claim:

1. In apparatus of the class described, a gas inlet, a gas duct leading from said inlet to a higher level, means for forcing a current of gas from said inlet through said duct, a spray producing device located in said duct intermediate the inlet and its highest level, a reservoir located above said spray producing device and having operative connection therewith and means located in the higher level of said duct for reclaiming excess moisture from the gas passing through said duct, and leading such reclaimed moisture to said reservoir.

2. In apparatus of the class described, a gas inlet, an upright gas duct leading from said inlet to an upper duct, means for causing a current of gas to pass from said inlet through said ducts, a humidifying device located in said duct intermediate said inlet and its highest level, a reservoir located in said humidifying device and having operative connection therewith and means located in the higher level of said duct for reclaiming excess moisture from the said gas passing through said upper duct and leading it to the reservoir.

3. In apparatus of the class described, a gas inlet, an upright gas duct leading from said inlet to an upper duct, means for causing a current of gas to pass from said inlet through said ducts, a spray producing device located in the upright duct, a reservoir adapted to feed said spray producing device by gravity and means located in the upper duct for reclaiming excess moisture from the gas passing through said duct and leading it to the reservoir.

4. In apparatus of the class described, a gas inlet, an upright gas duct leading from said inlet to an upper horizontal duct, means for causing a current of gas to pass from said inlet through said ducts, a spray producing device located in the upright duct, a reservoir adapted to feed said spray producing device by gravity and means located in the upper duct for reclaiming excess moisture from the gas passing said upper duct and leading it to the reservoir.

JOHN E. BOLLING.

Copies of this patent may be obtained for five cents each, by addressing the "Commissioner of Patents, Washington, D. C."